US011983808B2

(12) United States Patent
Tiwari et al.

(10) Patent No.: US 11,983,808 B2
(45) Date of Patent: May 14, 2024

(54) CONVERSATION-DRIVEN CHARACTER ANIMATION

(71) Applicant: Disney Enterprises, Inc., Burbank, CA (US)

(72) Inventors: Sanchita Tiwari, Cumming, GA (US); Justin Ali Kennedy, Norwell, MA (US); Mark R. Brashear, Corona, CA (US); Daniel Cahall, Philadelphia, PA (US); Dumene Comploi, Los Angeles, CA (US); Dirk Van Dall, Shelter Island, NY (US); Keith Comito, Seaford, NY (US)

(73) Assignee: Disney Enterprises, Inc., Burbank, CA (US)

( * ) Notice: Subject to any disclaimer, the term of this patent is extended or adjusted under 35 U.S.C. 154(b) by 48 days.

(21) Appl. No.: 17/894,984

(22) Filed: Aug. 24, 2022

(65) Prior Publication Data

US 2024/0070951 A1 Feb. 29, 2024

(51) Int. Cl.
*G06T 13/40* (2011.01)
*G06N 20/00* (2019.01)
*G06T 13/80* (2011.01)

(52) U.S. Cl.
CPC ............. *G06T 13/40* (2013.01); *G06N 20/00* (2019.01); *G06T 13/80* (2013.01); *G06T 2213/12* (2013.01)

(58) Field of Classification Search
CPC ..... G06T 13/40; G06T 13/80; G06T 2213/12; G06N 20/00; G06F 40/284; G06F 40/35; H04L 51/00
See application file for complete search history.

(56) References Cited

U.S. PATENT DOCUMENTS 10,977,287 B2 4/2021 Schriber
11,134,034 B2 9/2021 Goslin
(Continued)

OTHER PUBLICATIONS

Kao, Chien-Hao, Chih-Chieh Chen, and Yu-Tza Tsai. "Model of multi-turn dialogue in emotional chatbot." 2019 International Conference on Technologies and Applications of Artificial Intelligence (TAAI). IEEE, 2019. (Year: 2019).*

(Continued)

*Primary Examiner* — Daniel F Hajnik
(74) *Attorney, Agent, or Firm* — Farjami & Farjami LLP

(57) ABSTRACT

A system for producing conversation-driven character animation includes a computing platform having processing hardware and a system memory storing software code, the software code including multiple trained machine learning (ML) models. The processing hardware executes the software code to obtain a conversation understanding feature set describing a present state of a conversation between a digital character and a system user, and to generate an inference, using at least a first trained ML model of the multiple trained ML models and the conversation understanding feature set, the inference including labels describing a predicted next state of a scene within the conversation. The processing hardware further executes the software code to produce, using at least a second trained ML model of the multiple trained ML models and the labels, an animation stream of the digital character participating in the predicted next state of the scene within the conversation.

24 Claims, 9 Drawing Sheets

(56) References Cited

U.S. PATENT DOCUMENTS

| | | | |
|---|---|---|---|
| 11,269,941 B2 | 3/2022 | Schriber | |
| 11,455,549 B2 | 9/2022 | Abrams | |
| 2015/0187112 A1* | 7/2015 | Rozen | G06T 13/40 |
| | | | 345/473 |
| 2017/0256086 A1* | 9/2017 | Park | G06T 7/73 |
| 2019/0213778 A1* | 7/2019 | Du | G06T 15/04 |
| 2021/0104236 A1 | 4/2021 | Doggett | |
| 2021/0329342 A1 | 10/2021 | Fidaleo | |
| 2022/0157036 A1* | 5/2022 | Chen | A63F 13/42 |
| 2022/0189119 A1* | 6/2022 | Seo | G06T 7/00 |
| 2023/0123820 A1* | 4/2023 | Wang | G06T 13/40 |
| | | | 345/474 |

OTHER PUBLICATIONS

Chu, Hang, Daiqing Li, and Sanja Fidler. "A face-to-face neural conversation model." Proceedings of the IEEE Conference on Computer Vision and Pattern Recognition. 2018. (Year: 2018).*

Yusuke Shinyama, Takenobu Tokunaga, Hozumi Tanaka "Kairai—Software Robots Understanding Natural Language" 2000 6 Pgs.

Hozumi Tanaka, Takenobu Tokunaga, Yusuke Shinyama "Animated Agents Capable of Understanding Natural Language and Performing Actions" Predinger, H., Ishizuka, M. (eds) Life-Like Characters. Cognitive Technologies. Springer, Berlin, Heidelberg 2004 10 Pgs.

Pulkit Junega, P. Gayathri, Anshupriya Srivastava, Hemant Jain "Emotion-Driven Facial Animation for Chat-Bots" International Journal of Recent Technology and Engineering (UJRTE) vol. 8 Issue 4—Nov. 2019 6 Pgs.

Tero Karras, Timo Aila, Samuli Laine, Antti Herva, Jaakko Lehtinen "Audio-Driven Facial Animation by Joint End-to-End Learning of Pose and Emotion" ACM Transactions on Graphics, vol. 36, No. 4, Article 94. Jul. 2017 12 Pgs.

Najmeh Sadoughi, Carlos Busso "Speech-Driven Animation with Meaningful Behaviors" Speech Communication 2019 19 Pgs.

Tarek Ait Baha, Mohamed El Hajji, Youssef Es-Saddy, Hammou Fadili Procedia Computer Science vol. 198, 2022 4 Pgs.

\* cited by examiner

CONVERSATION-DRIVEN CHARACTER ANIMATION

BACKGROUND

Advances in artificial intelligence (AI) have led to the generation of a variety of digital characters, such as avatars for example, that simulate social interaction. However, conventionally generated AI digital characters typically project a single synthesized persona that tends to lack character and naturalness.

In contrast to conventional interaction simulations by AI digital characters, natural interactions between human beings are more nuanced, varied, and dynamic. For example, interactions between humans are typically responsive to a variety of factors including environmental features such as location, weather, and lighting, the respective goals of the interaction partners, their respective emotional states, and the content of a conversation between them. That is to say, typical shortcomings of AI digital character interactions include their failure to integrate verbal communications with non-verbal cues arising from, complementing, and enhancing the content of those verbal communications. Thus, there is a need in the art for an animation solution capable of producing an animation sequence of a digital character participating in an interaction that is dynamically conversation-driven in real-time by the dialogue between the digital character and an interaction partner such as a human user.

DETAILED DESCRIPTION

Figure 1:
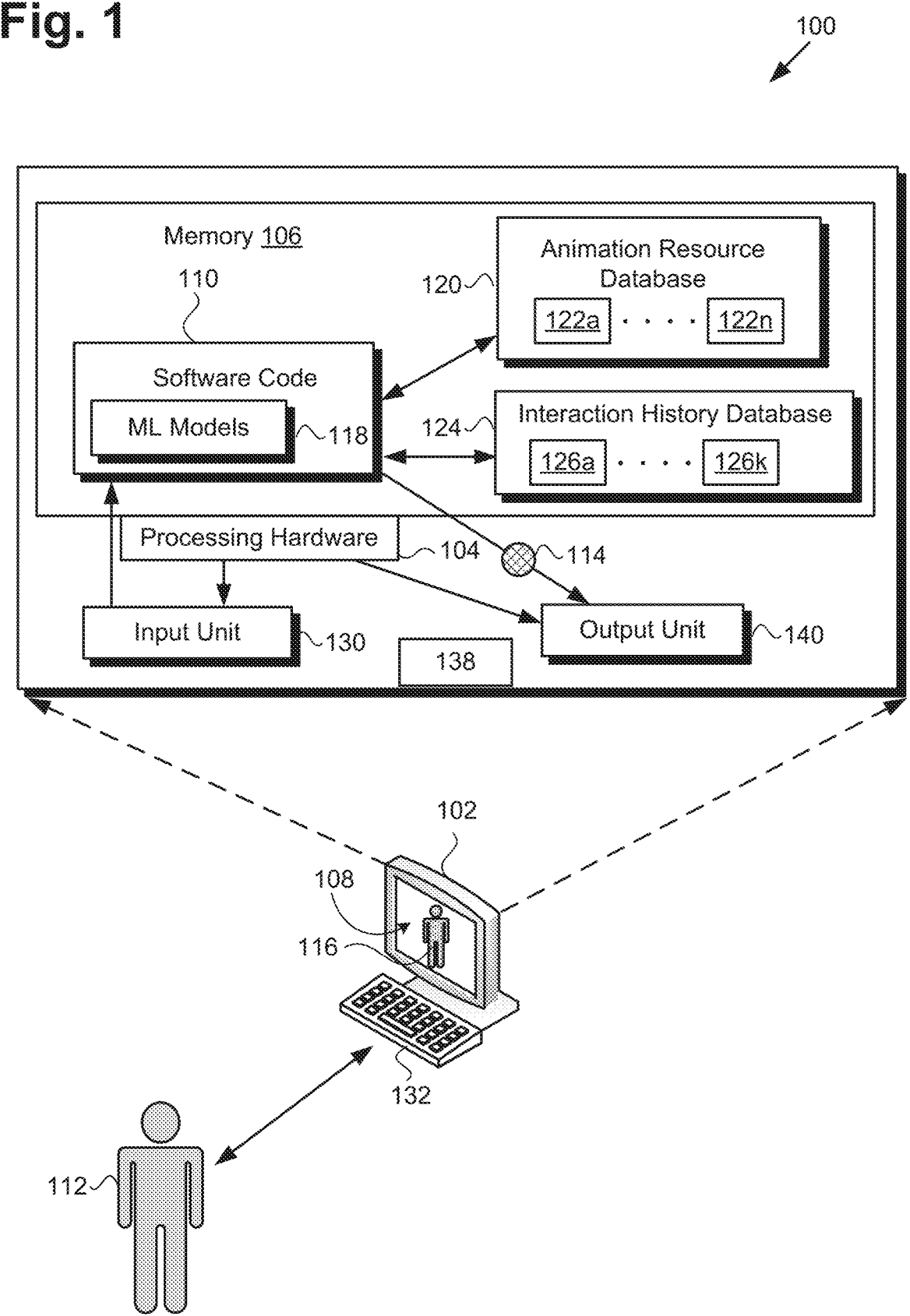
FIG. 1 shows an exemplary system for producing conversation-driven character animation, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for producing conversation-driven character animation that address and overcome the deficiencies in the conventional art. That is to say, the present application discloses systems and methods for producing an animation clip or animation stream, (hereinafter "animation stream") and other scene elements like haptics and expressive speech of a digital character participating in an interaction that is dynamically conversation-driven in real-time by the dialogue between the digital character and an interaction partner such as a human user. Moreover, the present animation solution can advantageously be implemented as substantially automated systems and methods.

It is noted that, as used in the present application, the terms "automation," "automated," and "automating" refer to systems and processes that do not require the participation of a human system administrator. Although in some implementations the animation streams produced by the systems and methods disclosed herein may be reviewed or even modified by a human editor or system administrator, that human involvement is optional. Thus, the methods described in the present application may be performed under the control of hardware processing components of the disclosed systems.

It is further noted that the expression "conversation-driven character animation" refers to an animation stream of a digital character in conversation with an interaction partner, such as a human being for example, that may take into account the intent of the interaction partner and the sentiment of either or both the digital character and the interaction partner, as well as past, present, and predicted future states of the conversation. Thus, a conversation-driven character animation stream may be produced based on past interactions between the digital character and interaction partner, the present state of a conversation between the digital character and the interaction partner, and a predicted next state of a scene within that conversation.

It is also noted that, as defined in the present application, the expression "predicted next state of a scene within the conversation" may refer to a scene including language based communications in the form of speech or text, for example, and in some implementations including one or more of non-verbal expressions, environmental conditions, props or accessories, costuming, expressive voice and haptic effects. Moreover, the term "non-verbal expression" may refer to vocalizations that are not language based, i.e., non-verbal vocalizations, as well as to physical gestures, postures, whole body movements, and facial expressions. Examples of non-verbal vocalizations may include a sigh, a murmur of agreement or disagreement, or a giggle, to name a few.

Furthermore, as used in the present application, the term "digital character" refers to a non-human communicative entity rendered in hardware and software that is designed for expressive interaction with one or more interaction partners, which may be human users for example. In some use cases, a digital character may be instantiated as a virtual character rendered on a display and appearing to watch and listen to an interaction partner in order to have a conversation with the interaction partner. Such a digital character may be depicted in an animation stream configured for rendering as a two-dimensional (2D) or three-dimensional (3D) animation including digital representations of persons, fictional characters, locations, objects, and identifiers such as brands and logos, for example, which populate a virtual reality (VR), augmented reality (AR), or mixed reality (MR) environment. Moreover, that animation stream may depict virtual worlds that can be experienced by any number of users synchronously and persistently, while providing continuity of data such as personal identity, user history, entitlements, possessions, payments, and the like. It is noted that the concepts disclosed by the present application may also be used to produce an animation stream that is a hybrid of traditional audio-video (AV) content and fully immersive VR/AR/MR experiences, such as interactive video.

As defined in the present application, the term "intent" refers to a goal oriented psychological state of a human user and is distinguishable from "sentiment." which is defined to be the present emotional state of the human user or digital character. Examples of the types of goals determining intent include the acquisition of information, arrival at a particular destination, or viewing or participating in an event, to name a few. Examples of sentiment may include happy, sad, angry, nervous, or excited, again to name merely a few. Furthermore, because it is not possible to have definite knowledge of a human user's inner mental state, as used in the present application the terms "intent" and "sentiment" are to be interpreted as "inferred intent" and "inferred sentiment." Thus, as used herein, the "intent of the user" refers to the "inferred intent of the user" and the "sentiment of the user" refers to the "inferred sentiment of the user."

As defined in the present application, the feature "character persona" refers to a template or other representative model providing an exemplar for a particular digital character. That is to say, a character persona may be affirmatively associated with a specific character name, specific visual features, prosody, idiosyncratic movements or expressions, or specific personality traits.

FIG. 1 shows a diagram of system 100 for producing conversation-driven character animation, according to one exemplary implementation. As shown in FIG. 1, system 100 includes computing platform 102 having processing hardware 104, input unit 130 including input device 132, output unit 140 including display 108, transceiver 138, and memory 106 implemented as a computer-readable non-transitory storage medium. According to the present exemplary implementation, memory 106 stores software code 110 including multiple trained machine learning (ML) models 118, and animation resource database 120 storing pre-existing video frames 122a, . . . , 122n (hereinafter "pre-existing animation 122a-122n"), as well as metadata and 3D spatial information such as skeleton model coordinates and dense pose mesh points. In addition, according to the exemplary implementation shown in FIG. 1, memory 106 of system 100 also stores interaction histories 126a, . . . , 126k (hereinafter "interaction histories 126a-126k"). In addition, FIG. 1 shows digital character 116 for which an animation stream for initiating or continuing an interaction may be produced by software code 110, when executed by processing hardware 104. Also shown in FIG. 1 are system user 112 of system 100 acting as an interaction partner of digital character 116, and animation stream 114 of digital character 116 participating in a predicted next state of a scene within the interaction between digital character 116 and system user 112.

It is noted that system 100 may be implemented as any machine configured to instantiate a digital character, such as digital character 116. It is further noted that although FIG. 1 depicts digital character 116 as being instantiated as a virtual character rendered on display 108, that representation is provided merely by way of example. In other implementations, digital character 116 may be instantiated by tabletop machines, such as displays, or figurines, or by wall mounted displays, to name a few examples.

It is further noted that although FIG. 1 depicts one system user 112 and one digital character 116, that representation is merely exemplary. In other implementations, one digital character, two digital characters, or more than two digital characters may engage in an interaction with one another, with one or more human users corresponding to system user 112, or with one or more human users as well as with one or more other digital characters. That is to say, in various implementations interaction partners may include one or more digital characters, one or more human users, or one or more digital characters and one or more human users.

It is also noted that each of interaction histories 126a-126k may be an interaction history dedicated to interactions of digital character 116 with a particular interaction partner, such as system user 112, or to one or more distinct temporal sessions over which an interaction of digital character 116 with the interaction partner extends. That is to say, in some implementations, some or all of interaction histories 126a-126k may be personal to different respective interaction partners of digital character 116, while in other implementations, some or all of interaction histories 126a-126k may be dedicated to a particular temporal interaction session or series of temporal interaction sessions including the same interaction partner.

Moreover, while in some implementations interaction histories 126a-126k may be comprehensive with respect to a particular interaction partner or temporal interaction, in other implementations, interaction histories 126a-126k may retain only a predetermined number of the most recent interactions with an interaction partner, or a predetermined number of interactive exchanges or turns during an interaction. Thus, in some implementations, interaction history 126a may store only the most recent four, or any other predetermined number of interactions between digital character 116 and system user 112 or, or the most recent four, or any other predetermined number of interactions by any or all participants in a group interaction session.

It is emphasized that the data describing previous interactions and retained in interaction history database 124 is exclusive of personally identifiable information (PII) of system users with whom digital character 116 has interacted. Thus, although digital character 116 is typically able to distinguish an anonymous system user with whom a previous interaction has occurred from anonymous system users having no previous interaction experience with digital character 116, interaction history database 124 does not retain information describing the age, gender, race, ethnicity, or any other PII of any system user with whom digital character 116 converses or otherwise interacts.

Although the present application refers to software code 110, animation resource database 120, and interaction history database 124 as being stored in memory 106 for conceptual clarity, more generally, memory 106 may take the form of any computer-readable non-transitory storage medium. The expression "computer-readable non-transitory storage medium." as defined in the present application, refers to any medium, excluding a carrier wave or other transitory signal that provides instructions to processing hardware 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

Processing hardware 104 may include multiple hardware processing units, such as one or more central processing units, one or more graphics processing units, and one or more tensor processing units, one or more field-programmable gate arrays (FPGAs), custom hardware for machine-learning training or machine-learning based prediction, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 110, from memory 106, while a GPU may be implemented to reduce the processing overhead of the CPU by performing computationally intensive graphics or other processing tasks. A TPU is an application-specific integrated circuit (ASIC) configured specifically for artificial intelligence (AI) applications such as machine learning modeling.

It is noted that, as defined in the present application, the expression "machine learning model" or "ML model" may refer to a mathematical model for making future predictions based on patterns learned from samples of data or "training data." Various learning algorithms can be used to map correlations between input data and output data. These correlations form the mathematical model that can be used to make future predictions on new input data. Such a predictive model may include one or more logistic regression models, Bayesian models, or artificial neural networks (NNs). Moreover, a "deep neural network," in the context of deep learning, may refer to a NN that utilizes multiple hidden layers between input and output layers, which may allow for learning based on features not explicitly defined in raw data. It is further noted that the expressions "inference" and "prediction" are terms of art in the context of machine learning, and as used herein have their ordinary and customary meaning known in the art.

Input device 132 of system 100 may include any hardware and software enabling system user 112 to enter data into system 100. Examples of input device 132 may include a keyboard, trackpad, joystick, touchscreen, or voice command receiver, to name a few. Transceiver 138 of system 100 may be implemented as any suitable wireless communication unit. For example, transceiver 138 may be implemented as a fourth generation (4G) wireless transceiver, or as a 5G wireless transceiver. In addition, or alternatively, transceiver 138 may be configured for communications using one or more of WiFi, Bluetooth. ZigBee, and 60 GHz wireless communications methods.

Figure 2A:
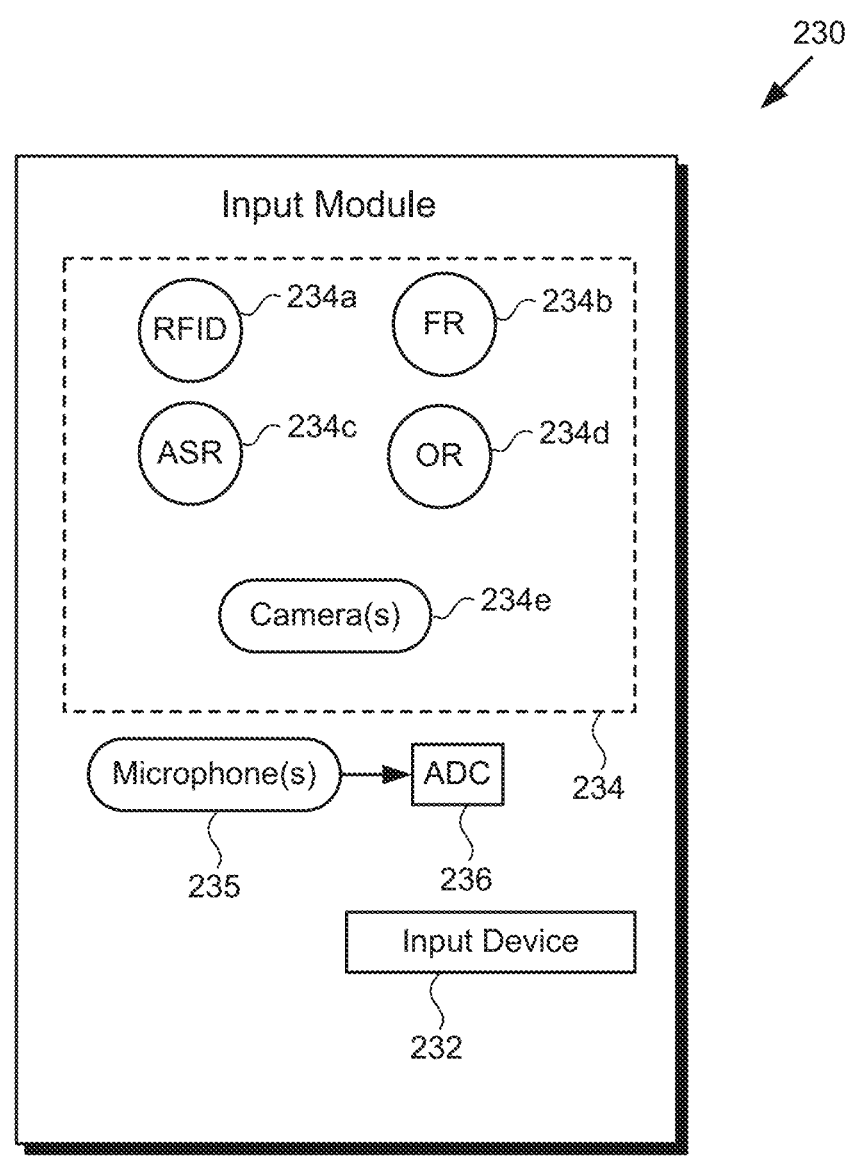
FIG. 2A shows a more detailed diagram of an input unit suitable for use as a component of the system shown in FIG. 1, according to one implementation.

FIG. 2A shows a more detailed diagram of input module 230 suitable for use in system 100, in FIG. 1, according to one implementation. As shown in FIG. 2A, input module 230 includes input device 232, sensors 234, one or more microphones 235 (hereinafter "microphone(s) 235"), and analog-to-digital converter (ADC) 236. As further shown in FIG. 2A, sensors 234 of input module 230 may include radio-frequency identification (RFID) sensor 234a, facial recognition (FR) sensor 234b, automatic speech recognition (ASR) sensor 234c, object recognition (OR) sensor 234d, and one or more cameras 234e (hereinafter "camera(s) 234e"). Input module 230 and input device 232 correspond respectively in general to input module 130 and input device 132, in FIG. 1. Thus, input module 130 and input device 132 may share any of the characteristics attributed to respective input module 230 and input device 232 by the present disclosure, and vice versa.

It is noted that the specific sensors shown to be included among sensors 234 of input module 130/230 are merely exemplary, and in other implementations, sensors 234 of input module 130/230 may include more, or fewer, sensors than RFID sensor 234a. FR sensor 234b, ASR sensor 234c, OR sensor 234d, and camera(s) 234e. Moreover, in other implementations, sensors 234 may include a sensor or sensors other than one or more of RFID sensor 234a. FR sensor 234b, ASR sensor 234c, OR sensor 234d, and camera(s) 234e. It is further noted that camera(s) 234e may include various types of cameras, such as red-green-blue (RGB) still image and video cameras, RGB-D cameras including a depth sensor, and infrared (IR) cameras, for example.

Figure 2B:
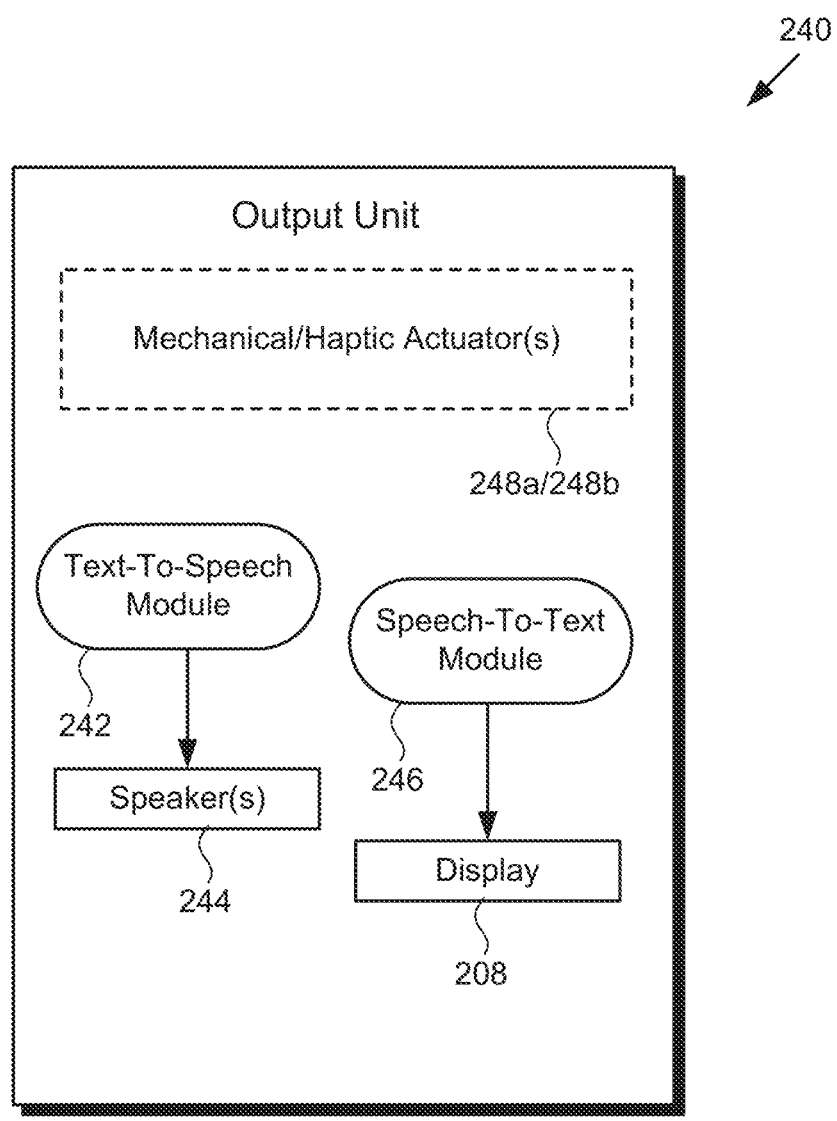
FIG. 2B shows a more detailed diagram of an output unit suitable for use as a component of the system shown in FIG. 1, according to one implementation.

FIG. 2B shows a more detailed diagram of output unit 240 suitable for use as a component of system 100, in FIG. 1, according to one implementation. As shown in FIG. 2B, output unit 240 may include one or more of Text-To-Speech (TTS) module 242 in combination with one or more audio speakers 244 (hereinafter "speaker(s) 244"), and Speech-To-Text (STT) module 246 in combination with display 208. As further shown in FIG. 2B, in some implementations, output unit 240 may include one or more mechanical actuators 248a (hereinafter "mechanical actuator(s) 248a"), one or more haptic actuators 248b (hereinafter "haptic actuator(s) 248b"), or a combination of mechanical actuator(s) 248a and haptic actuators(s) 248b. It is further noted that, when included as a component or components of output unit 240, mechanical actuator(s) 248a may be used to produce vibrations, forces, torques, and the like. Output unit 240 and display 208 correspond respectively in general to output unit 140 and display 108, in FIG. 1. Thus, output unit 140 and display 108 may share any of the characteristics attributed to output unit 240 and display 208 by the present disclosure, and vice versa.

It is noted that the specific features shown to be included in output unit 140/240 are merely exemplary, and in other implementations, output unit 140/240 may include more, or fewer, features than TTS module 242, speaker(s) 244. STT module 246, display 208, mechanical actuator(s) 248a, and haptic actuator(s) 248b. Moreover, in other implementations, output unit 140/240 may include a feature or features other than one or more of TTS module 242, speaker(s) 244. STT module 246, display 208, mechanical actuator(s) 248a, and haptic actuator(s) 248b. It is further noted that display 108/208 of output unit 140/240 may be implemented as a liquid crystal display (LCD), light-emitting diode (LED) display, organic light-emitting diode (OLED) display, quantum dot (QD) display, or any other suitable display screen that perform a physical transformation of signals to light.

Figure 3:
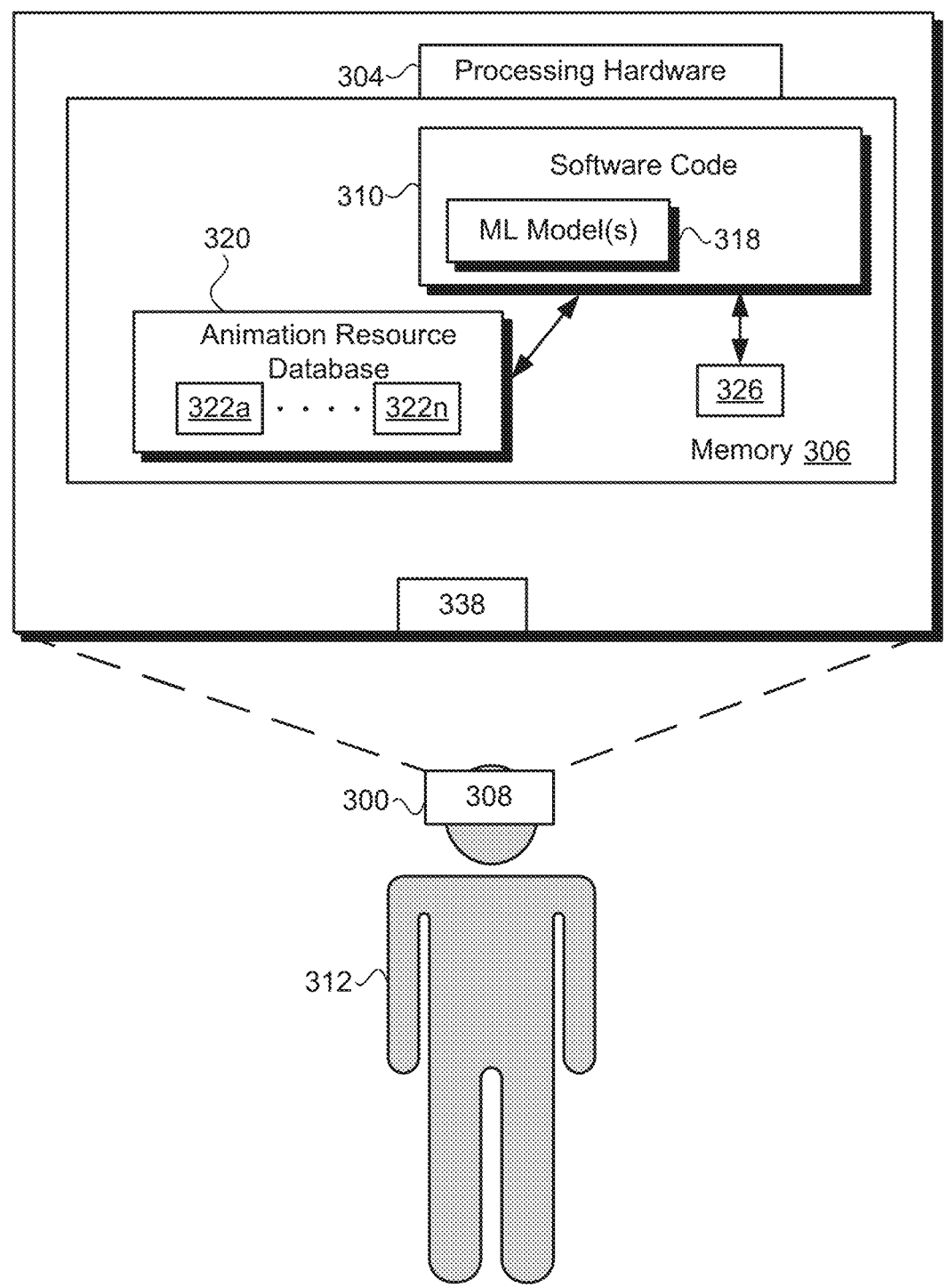
FIG. 3 shows an exemplary system for producing conversation-driven character animation, according to another implementation.

FIG. 3 shows an exemplary system producing conversation-driven character animation, according to another implementation. As shown in FIG. 3, system 300 is shown as a VR headset of system user 312. As further shown in FIG. 3, system 300 includes processing hardware 304, memory 306 implemented as a computer-readable non-transitory storage medium, display 308, and transceiver 338. According to the exemplary implementation shown in FIG. 3, memory 306 of system 300 includes software code 310, animation resource database 320 storing pre-existing video frames 322a, . . . . , 322n (hereinafter "pre-existing animation 322a-322n"), as well as metadata and 3D spatial information such as skeleton model coordinates and dense pose mesh points. In addition, according to the exemplary implementation shown in FIG. 3, memory 306 of system 300 also stores interaction history 326 of system user 312.

Although depicted as a VR headset in FIG. 3, in various implementations, system 300 may take the form of any suitable mobile computing system that implements data processing capabilities sufficient to implement the functionality ascribed to system 300 herein. For example, in other implementations, system 300 may take the form of a smartphone, tablet computer, game console, AR glasses or goggles, or a smartwatch or other smart wearable device providing display 308.

System 300 and system user 312 correspond respectively in general to system 100 and system user 112, in FIG. 1. Consequently, system 300 and system user 312 may share any of the characteristics attributed to respective system 100 and system user 112 by the present disclosure, and vice versa. Thus, although not shown in FIG. 3, like system 100, system 300 may include features corresponding respectively to input unit 130/230, input device 132, and output unit 140/240, and may be configured to render animation stream 114 including digital character 116 on display 308. Moreover processing hardware 304, memory 306, display 308, and transceiver 338, in FIG. 3, correspond respectively in general to processing hardware 104, memory 106, display 108, and transceiver 138, in FIG. 1. Thus, processing hardware 304, memory 306, display 308, and transceiver 338 may share any of the characteristics attributed to respective processing hardware 104, memory 106, display 108, and transceiver 138 by the present disclosure, and vice versa.

In addition, software code 310 and animation resource database 320 including pre-existing animation 322a-322n, in FIG. 3, correspond respectively in general to software code 110 and animation resource database 120 including pre-existing animation 122a-122n, in FIG. 1, while interaction history 326 corresponds in general to any one of interaction histories 126a-126k. That is to say, software code 310 and animation resource database 320 including pre-existing animation 322a-322n may share any of the characteristics attributed to respective software code 110 and animation resource database 120 including pre-existing animation 122a-122n by the present disclosure, and vice versa, while interaction history 326 may share any of the characteristics attributed to interaction histories 126a-126k. In other words, system 300 may include substantially all of the features and functionality attributed to system 100 by the present disclosure.

According to the exemplary implementation shown in FIG. 3, software code 310 and animation resource database 320 are located in memory 306 of system 300, subsequent to transfer of software code 310 and animation resource database 320 to system 300 over a packet-switched network, such as the Internet, for example. Once present on system 300, software code 310 and animation resource database 320 may be persistently stored in memory 306, and software code 310 may be executed locally on system 300 by processing hardware 304.

One advantage of local retention and execution of software code 310 on system 300 in the form of a personal device of system user 312 is that any personally identifiable information (PH) or other sensitive personal information of system user 312 stored on system 300 may be sequestered on the personal device in the possession of system user 312 and be unavailable to system 100 or other external agents.

Figure 4:
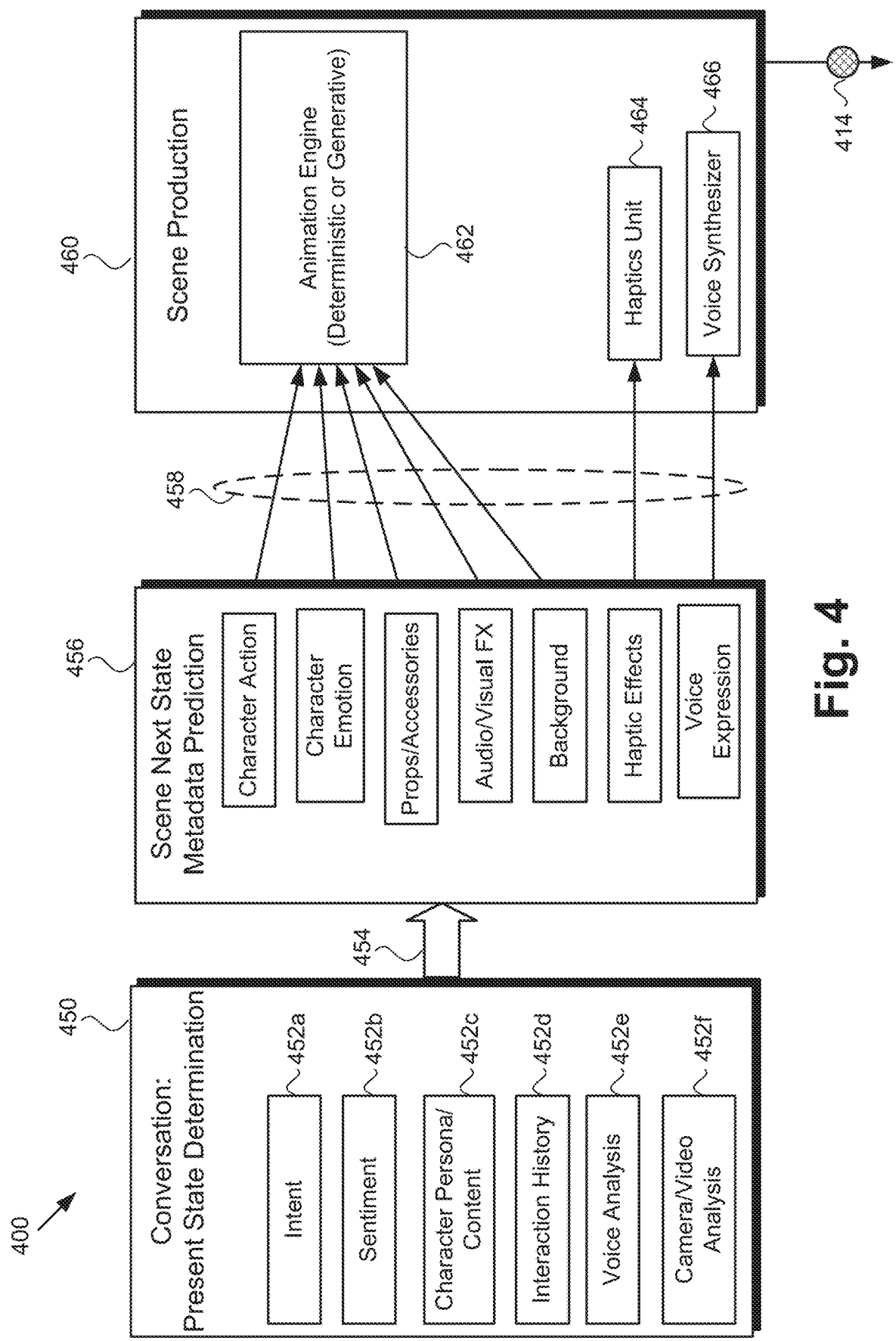
FIG. 4 shows a diagram of an exemplary processing pipeline for producing conversation-driven character animation, according to one implementation.

FIG. 4 shows a diagram of exemplary processing pipeline 400 for producing conversation-driven character animation and behavior, according to one implementation. As shown in FIG. 4, processing pipeline 400 includes conversation understanding stage 450, scene next state metadata prediction stage 456, and scene production stage 460. Also shown in FIG. 4 is conversation understanding feature set 454 describing a present state of a conversation between a digital character corresponding to digital character 116 in FIG. 1, and a system user corresponding to system user 112/312 in FIGS. 1 and 3, metadata labels 458 (hereinafter "labels 458") describing a predicted next state of the scene including animation stream 414 of the digital character participating in the predicted next state of the scene within the conversation. It is noted that animation stream 414 corresponds in general to animation stream 114, in FIG. 1, and those corresponding features may share any of the characteristics attributed to either feature by the present disclosure. It is further noted that, in addition to animation, animation stream 414 may include one or more of haptic effects or a synthesized expressive voice of digital character 116.

It is also noted that, in some implementations, all of the features of processing pipeline shown in FIG. 4 may be implemented by software code 110/310 of system 100/300. That is to say, in addition to trained ML models 118, in some implementations software code 110/310 may include features corresponding respectively to conversation understanding stage 450, scene next state metadata prediction stage 456, and scene production stage 460. However, in other implementations, software code 110/310 may include features corresponding respectively to scene next state metadata prediction stage 456, and scene production stage 460, but may omit conversation understanding stage 450. In those latter implementations, software code 110/310 may receive conversation understanding feature set 454 from conversation understanding stage 450 in the form of a separate processing unit of system 100/300.

As shown in FIG. 4, conversation understanding stage 450 may include multiple analysis modules, which may include one or more trained ML models for example, to determine the present state of a conversation between a digital character and one or more interaction partner (hereinafter "system user"). For example, conversation understanding stage 450 may include intent analysis module 452a for determining the intent of the system user, sentiment analysis module 452b for determining the sentiment of one or both of the system user and the digital character, and character persona/content module 452c for determining context based on the character persona of the digital character and the present content of the conversation.

In addition, or alternatively, in some implementations, conversation understanding stage 450 may include interaction history analysis module 452d for determining context based on a previous conversation or conversations between the digital character and the system user, voice analysis module 452e for performing audio analysis and digital signal processing of speech by the system user, and camera/video analysis module 452f for determining the present state of the conversation based on gestures, facial expressions, postures, and movements by the system user. Thus, in various implementations, the present state of the conversation between the digital character and the system user may be one or more of text-based using state-of-the-art natural language understanding (NLU) techniques, audio-based using audio analysis of speech by the system user, and image-based using image capture data received from one or more cameras.

The results of the various analyses performed by conversation understanding stage 450 may be combined to provide conversation understanding feature set 454 describing the present state of a conversation between the digital character and the system user. Conversation understanding feature set 454 may be obtained by scene next state metadata prediction stage 456 of processing pipeline 400, and may be used by scene next state metadata prediction stage 456 to generate an inference including labels 458 describing a predicted next state of the scene within the conversation using one or more trained ML models included in scene next state metadata prediction stage 456. Labels 458 may include a plurality of text entries, for example, describing one or more of an action by the digital character, an emotion of the digital character, props/accessories, including costuming, determined to be relevant to the predicted next state of the scene within the conversation, as well as audio/visual effects to complement or enhance that predicted next scene. In addition, or alternatively, labels 458 included in the inference generated by scene next state metadata prediction stage 456 may include text entries describing one or more of a scene background to complement or enhance the predicted next scene within the conversation between the digital character and the system user, haptic effects to complement or enhance the predicted next state of the scene, and voice expressions, such as prosody, whisper, or breathing for example, for the digital character during the predicted next scene within the conversation.

As further shown by FIG. 4, labels 458 included in the inference generated by scene next state metadata prediction stage 456 may be output to scene production stage 460 including animation engine 462, haptics unit 464, and voice synthesizer 466, each of which may include one or more trained ML models. As also shown by FIG. 4, animation production stage 460 may utilize labels 458 and one or more of animation engine 462, haptics unit 464, and voice synthesizer 466 to produce the scene 414. It is noted that alternative exemplary implementations of scene next state metadata prediction stage 456 are shown and described below by reference to FIGS. 5A and 5C, while the operation of scene production stage is further described below by reference to FIG. 6.

Figure 5A:
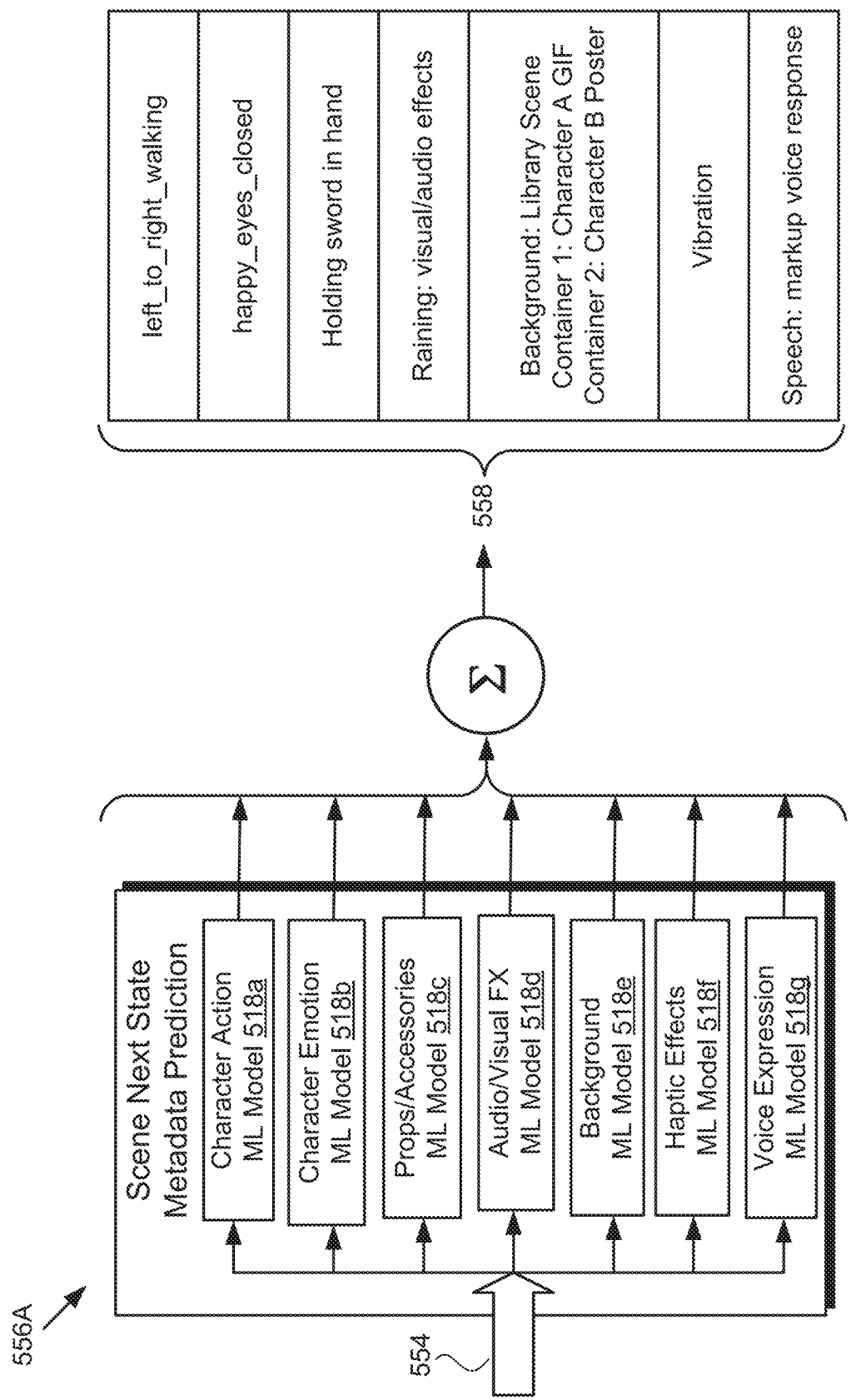
FIG. 5A shows an exemplary architecture for the scene next state metadata prediction stage of the processing pipeline shown in FIG. 4, according to one implementation.

FIG. 5A shows an exemplary architecture for the scene next state metadata prediction stage of the processing pipeline shown in FIG. 4, according to one implementation. It is noted that scene next state metadata prediction stage 556A, in FIG. 5A, corresponds in general to scene next state metadata prediction stage 456 of processing pipeline 400, in FIG. 4. Consequently, scene next state metadata prediction stage 456 may share any of the characteristics attributed to scene next state metadata prediction stage 556A by the present disclosure, and vice versa. In addition to exemplary scene next state metadata prediction stage 556A. FIG. 5A shows conversation understanding feature set 554 obtained as an input to scene next state metadata prediction stage 556A, and metadata labels 558 (hereinafter "labels 558") included in an inference generated by scene next state metadata prediction stage 556A and describing a predicted next state of a scene within a conversation between a digital character, such as digital character 116 in FIG. 1, and a system user, such as system user 112/312.

It is noted that conversation understanding feature set 554 and labels 558 correspond respectively in general to conversation understanding feature set 454 and labels 458 in FIG. 4. Consequently, conversation understanding feature set 454 and labels 458 may share any of the characteristics attributed to respective conversation understanding feature set 554 and labels 558 by the present disclosure, and vice versa.

According to the exemplary implementation shown in FIG. 5A, scene next state metadata prediction stage 556A includes multiple ML models, operating in parallel, i.e., contemporaneously, and each separately trained as an expert network, such as a trained expert neural network for example, for predicting particular features of a conversation. For example, as shown in FIG. 5A, scene next state metadata prediction stage 556A may include character action ML model 518a trained to generate an inference identifying an action by a digital character in a predicted next state of a scene within the conversation including the digital character, character emotion ML model 518b trained to generate an inference identifying an emotional state of the digital character in the predicted next state of the scene within the conversation, props/accessories ML model 518c trained to generate an inference identifying props and accessories, including costuming, likely to be relevant to the predicted next state of the scene within the conversation, and audio/visual effects ML model 518d trained to generate an inference identifying which such effects are likely to complement or enhance that predicted next state of the scene.

In addition, or alternatively, scene next state metadata prediction stage 556A may include background ML model 518e trained to generate an inference identifying a scene background to complement or enhance the predicted next state of the scene within the conversation between the digital character and the system user, haptic effects ML model 518f trained to generate an inference identifying haptic effects to complement or enhance the predicted next state of the scene, and voice expressions ML model 518g trained to generate an inference identifying vocal features, such as prosody for example, for the digital character during the predicted next state of the scene.

It is noted that trained character action ML model 518a, trained character emotion ML model 518b, trained props/accessories ML model 518c, trained audio/visual effects ML model 518d, trained background ML model 518e, trained haptic effects ML model 518f, and trained voice expressions ML model 518g correspond in general to trained ML models 118/318, in FIGS. 1 and 3. Thus, trained ML models 118/318 may share any of the characteristics attributed to any or all of trained character action ML model 518a, trained character emotion ML model 518b, trained props/accessories ML model 518c, trained to audio/visual effects ML model 518d, trained background ML model 518e, trained haptic effects ML model 518f, and trained voice expressions ML model 518g by the present disclosure, and vice versa.

As shown in FIG. 5A, the outputs of each of trained character action ML model 518a, trained character emotion ML model 518b, trained props/accessories ML model 518c, trained audio/visual effects ML model 518d, trained background ML model 518e, trained haptic effects ML model 518f, and trained voice expressions ML model 518g may be combined, as a weighted or unweighted sum for example, to provide labels 558. As further shown in FIG. 5A, labels 558 may include multiple text entries describing one or more actions, emotions, props/accessories, visual/audio effects, background, haptic effects, and voice expressions for the predicted next state of the scene within the conversation between the digital character and the system user.

Merely by way of example, and as depicted in FIG. 5A, labels 558 may include action label "left_to_right_walking,"

emotion label "happy_eyes_closed," props/accessories label "Holding sword in hand." audio/visual effects label "Raining visual/audio effects." In addition, labels 558 may include background labels "Library scene" including "Container 1" displaying a 3D real-time graphics format (USD/FBX) or a 2D graphics interchange format "GIF" image of "Character A" other than the digital character engaged in the conversation with the system user, and further including "Container 2" displaying a "Poster" of another "Character B" other than the digital character. Labels 558 may also include the haptic effects label "vibration," and one or more voice expression labels providing speech markups for speech by the digital character during the predicted next state of the scene within the conversation with the system user. The advantage of providing 3D real-time procedural animation data to the system allows for seamless blending of the character's state. In addition, multiplying those states with emotion/sentiment intensity values, context values, velocity, or distance from object and the like, will allow for much more organic, natural and less repetitive behavior.

Figure 5B:
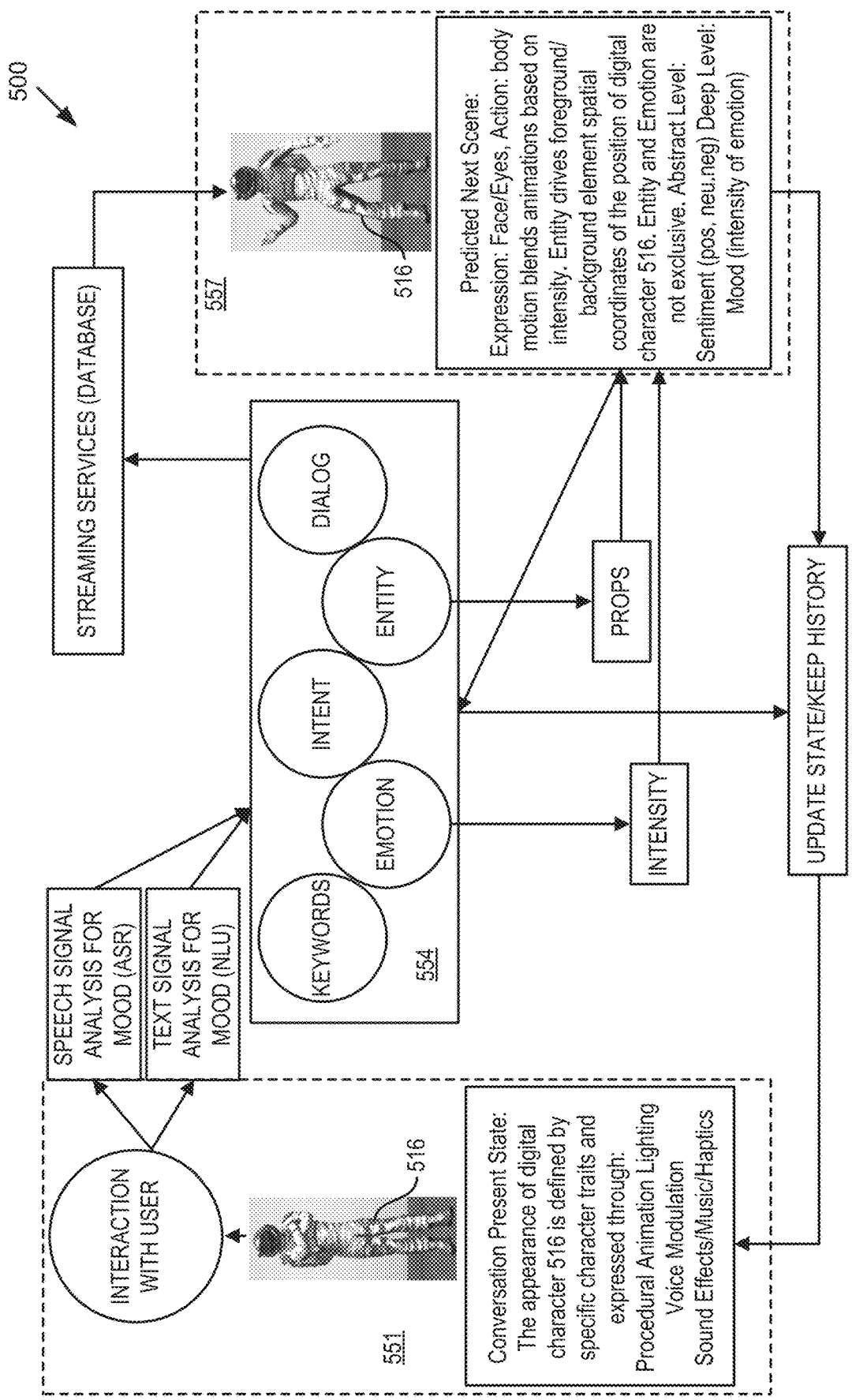
FIG. 5B shows an exemplary diagram depicting transition by a digital character from a present state of a conversation to a predicted next scene within the conversation, according to one implementation.

FIG. 5B shows exemplary diagram 500 depicting transition by a digital character from a present state of a conversation to a predicted next state of a scene within the conversation, according to one implementation. As shown in FIG. 5B, digital character 516 is initially in present state 551 of a conversation, and transitions to predicted next scene 557 of the conversation using conversation understanding feature set 554. It is noted that digital character 516 corresponds in general to digital character 116, in FIG. 1, while conversation understanding feature set 454, in FIG. 4. Thus, digital character 516 and conversation understanding feature set 554 may share any of the characteristics attributed to respective digital character 116 and conversation understanding feature set 454 by the present disclosure, and vice versa.

Figure 5C:
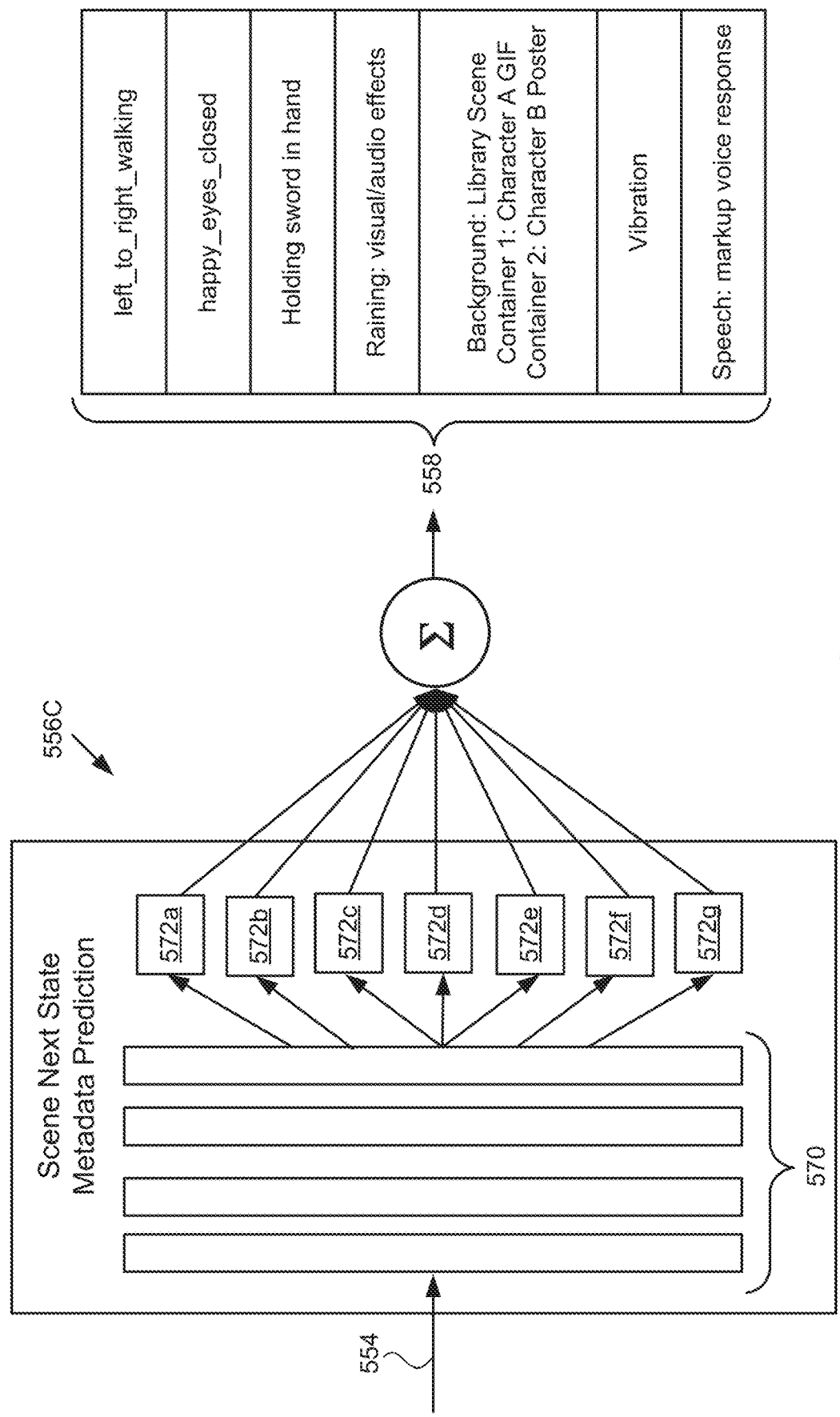
FIG. 5C shows an exemplary architecture for the scene next state metadata prediction stage of the processing pipeline shown in FIG. 4, according to another implementation.

FIG. 5C shows an exemplary architecture for the scene next state metadata prediction stage of the processing pipeline shown in FIG. 4, according to another implementation. It is noted that scene next state metadata prediction stage 556C, in FIG. 5C, corresponds in general to scene next state metadata prediction stage 456 of processing pipeline 400, in FIG. 4. Consequently, scene next state metadata prediction stage 456 may share any of the characteristics attributed to scene next state metadata prediction stage 556C by the present disclosure, and vice versa. It is further noted that any features in FIGS. 5A, 5B, and 5C identified by identical reference numbers correspond to one another and may share any of the characteristics attributed that feature in conjunction with either figure.

According to the example shown in FIG. 5C, scene next state metadata prediction stage 556A may be implemented using a multi-task transformer network architecture including shared layers 570, as well task specific heads 572a, 572b, 572c. 572d. 572e, 572f, and 572g (hereinafter "task heads 572a-572g") operating in parallel. i.e., contemporaneously, to generated labels 580. For example, scene next state metadata prediction stage 556C may include character action transformer 572a trained to generate an inference identifying an action or actions by a digital character in a predicted next state of a scene within a conversation including the digital character, character emotion transformer 572b trained to generate an inference identifying an emotional state of the digital character in the predicted next state of the scene within the conversation, props/accessories transformer 572c trained to generate an inference identifying props and accessories, including costuming, likely to be relevant to the predicted next state of the scene, and audio/visual effects transformer 572d trained to generate an inference identifying which such effects are likely to complement or enhance that predicted next state of the scene within the conversation.

In addition, or alternatively, scene next state metadata prediction stage 556C may include background transformer 572e trained to generate and inference identifying a scene background to complement or enhance the predicted next state of the scene within the conversation between the digital character and the system user, haptic effects transformer 572f trained to generate an inference identifying haptic effects to complement or enhance the predicted next state of the scene within the conversation, and voice expressions transformer 572g trained to generate an inference identifying vocal features, such as prosody for example, for the digital character during the predicted next state of the scene. It is noted that the multi-task transformer architecture of scene next state metadata prediction stage 556C correspond in general to trained ML models 118/318, in FIGS. 1 and 3. Thus, trained ML models 118/318 may share any of the characteristics attributed to any or all of shared layers 570 and task heads 572a-572g by the present disclosure, and vice versa.

Figure 6:
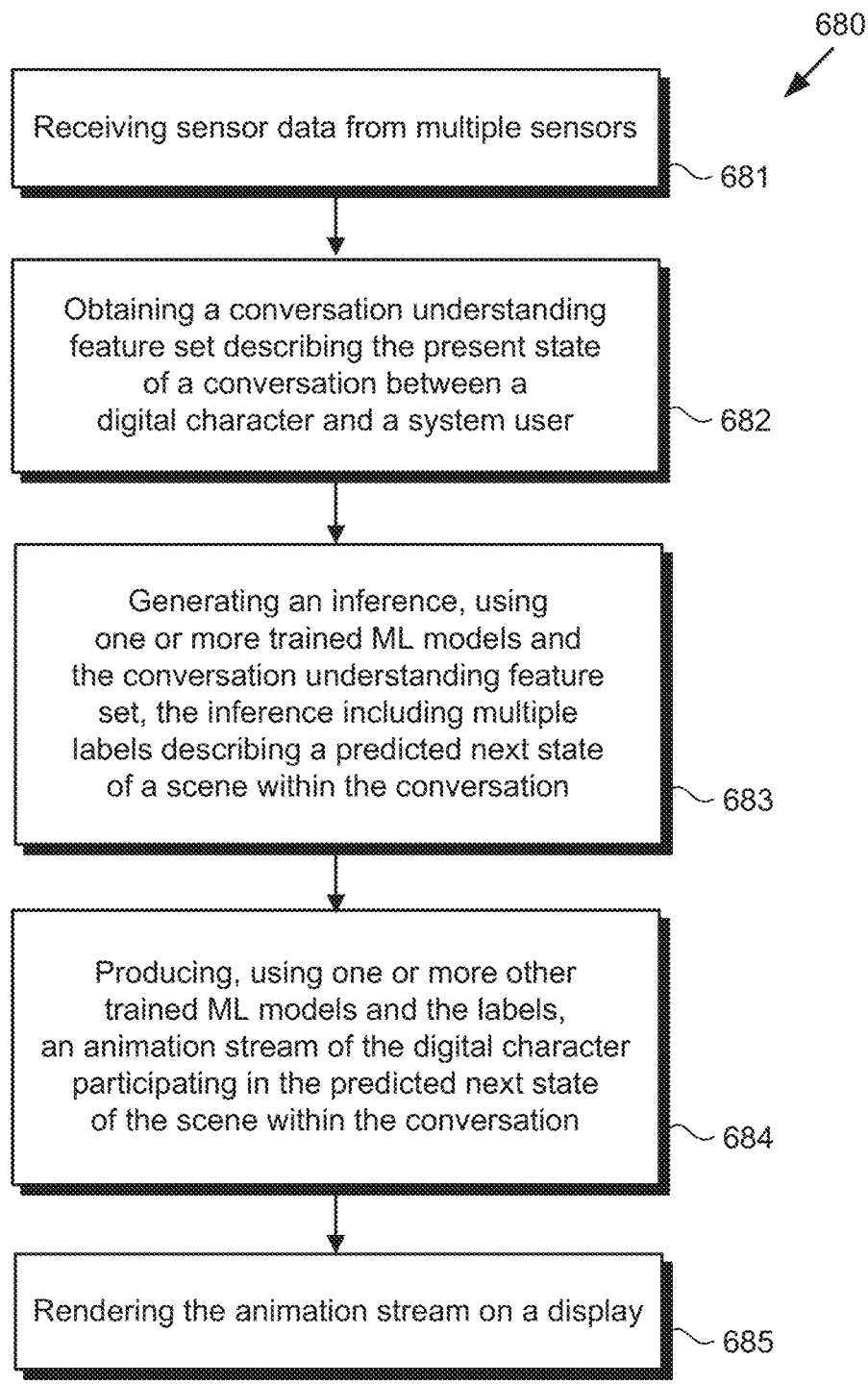
FIG. 6 shows a flowchart presenting an exemplary method for use by a system to produce conversation-driven character animation, according to one implementation.

The functionality of software code 110/310 will be further described by reference to FIG. 6. FIG. 6 shows flowchart 680 presenting an exemplary method for use by a system to produce conversation-driven character animation, according to one implementation. With respect to the method outlined in FIG. 6, it is noted that certain details and features have been left out of flowchart 680 in order not to obscure the discussion of the inventive features in the present application.

Referring to FIG. 6, with further reference to FIGS. 1, 2A. 3, and 4, flowchart 680 may begin with receiving sensor data from multiple sensors (action 681). It is noted that action 681 is optional, and in some implementations, the method outlined by flowchart may omit action 681. For example, in some implementations, as noted above by reference to FIG. 4, software code 110/310 may omit conversation understanding stage 450 of processing pipeline 400. In those implementations, the method outlined by flowchart 680 may begin instead with action 682 described below. However, in implementations in which the method outlined by flowchart 680 includes action 681, the sensor data received in action 681 may be generated by components of input unit 130/230, such as sensors 234 including camera(s) 234c, microphone(s) 235, or sensors 234 and microphone(s) 235.

Sensors 234 and microphone(s) 235 of input unit 130/230 may generate sensor data describing words and non-verbal vocalizations by system user 112/312, prosody of speech by system user 112/312, the location or environment of system user 112/312, facial features and gestures by system user 112/312, and postures assumed by system user 112/312, for example. In addition, in some implementations, sensor data generated by microphone(s) 235 may include microphone metadata describing the angle of arrival of sound at microphone(s) 235, as well the presence of background noise, such as crowd noise or background conversations, for example. Action 681, when included in the method outlined by flowchart 680, may be performed by software code 110/310, executed by processing hardware 104/304 of system 100/300, and using input unit 130/230, and conversation understanding stage 450 of processing pipeline 400.

Referring to the combination of FIGS. 1, 2A, 3, 4, and 6 with further reference to FIGS. 5A and 5C, the method outlined by flowchart 680 includes obtaining conversation understanding feature set 454/554 describing a present state of a conversation between digital character 112 and system user 112/312 (action 682). In some implementations, as noted, software code 110/310 may omit conversation understanding stage 450. In those implementations, conversation understanding feature set 454/554 may be obtained in action 682 by being received by scene next state metadata prediction stage 456/556A/556C included in software code 110/310, from conversation understanding stage 450. Thus, in those implementations, action 682 may be performed by software code 110/310, executed by processing hardware 104/304 of system 100/300, using scene next state metadata prediction stage 456/556A/556C.

However, in other implementations, as also noted above by reference to FIG. 4, software code 110/310 may include conversation understanding stage 450. In those implementations, conversation understanding feature set 454/554 may be obtained in action 682 by being generated using the sensor data received in action and one or more trained ML models 118/318 included in software code 110/310. Thus, in those implementations, action 682 may be performed by software code 110/310, executed by processing hardware 104/304 of system 100/300, and using conversation understanding stage 450.

Whether conversation understanding feature set 454/554 is obtained by being received by scene next state metadata prediction stage 456/556A/556C of software code 110/310 or by being generated by conversation understanding stage 450 of software code 110/310 using the sensor data received in action 681, conversation understanding feature set 454/554 describes the present state of the conversation between digital character 116 and system user 112/312. For example, conversation understanding feature set 454/554 may include one or more of voice analysis data derived from an audio analysis of speech by system user 112/312, an intent of system user 112/312, a sentiment of system user 112/312, or a sentiment of digital character 116. Moreover, in some implementations, conversation understanding feature set 454/554 may further include one or more of the character persona of digital character 116 and the content of the present state of the conversation between digital character 116 and system user 112/312, the interaction history of digital character 116 with system user 112/312, and the results of a camera/video analysis of system user 112/312.

Flowchart 680 further includes generating an inference, using one or more other trained ML models 118/318 of software code 110/310 and conversation understanding feature set 454/554, the inference including labels 458/558 describing the predicted next state of a scene within the conversation between digital character 116 and system user 112/312 (action 683). Action 683 may be performed by software code 110/310, executed by processing hardware 104/304 of system 100/300, and using scene next state metadata prediction stage 456/556A/556C.

For example as noted above by reference to FIG. 4, the results of the various analyses performed by conversation understanding stage 450 may be combined to provide conversation understanding feature set 454 describing the present state of a conversation between the digital character and the system user. Conversation understanding feature set 454 may be obtained by scene next state metadata prediction stage 456/556A/556C of processing pipeline 400, and may be used by scene next state metadata prediction stage 456/556A/556C to generate an inference including labels 458/558 describing a predicted next state of the scene within the conversation using one or more trained ML models included in scene next state metadata prediction stage 456/556A/556C.

As further noted above, labels 458/558 may include a plurality of text entries, for example, describing one or more of an action by the digital character, an emotion of the digital character, props/accessories, including costuming, determined to be relevant to the predicted next state of the scene within the conversation, as well as audio/visual effects to complement or enhance that predicted next scene. In addition, or alternatively, labels 458/558 included in the inference generated by scene next state metadata prediction stage 456/556A/556C may include text entries describing one or more of a scene background to complement or enhance the predicted next scene within the conversation between the digital character and the system user, haptic effects to complement or enhance the predicted next state of the scene, and voice expressions, such as prosody, whisper, or breathing for example, for the digital character during the predicted next scene within the conversation.

Flowchart 680 further includes producing, using still other one or more trained ML model 118/318 of software code 110/310 and labels 458/558 generated in action 683, animation stream 114/414 of digital character 116 participating in the predicted next state of the scene within the conversation with system user 112/312 (action 684). Action 684 may be performed by software code 110/310, executed by processing hardware 104/304 of system 100/300, and using animation production stage 460. In some implementations, action 684 may be performed deterministically, using a sequence of video frames selected from animation resource database 120/320 including pre-existing animation 122a-122n/322a-322n. However, in other implementations, action 684 may be performed generatively, by generating the new scene as dictated by the scene metadata predictor for inclusion in animation stream 114/414.

It is noted that the predicted next state of the scene within the conversation between digital character 116 and system user 112/312, depicted in the animation sequence produced in action 684 may include a variety of features, including visual features, audio features, and haptic effects. For example, visual features of the predicted next state of the scene may include a background scene (hereinafter "background") for the predicted next state, a lighting scheme for the predicted next state, and one or more props, including costuming, for the predicted next state. In addition, or alternatively, visual features of the predicted next state of the conversation may include one or more of a whole body movement, a gesture, or a facial expression of digital character 116. In some implementations, features of the predicted next state of the scene may further include one or more of synthesized speech by digital character 116 or one or more haptic effects. Moreover, in various implementations, animation stream 114/414 may be produced as a 2D or 3D animation.

Where production of animation stream 114/414 in action 684 is performed deterministically using preexisting streams, labels 458/558 output by scene next state metadata prediction stage 456/556A/556C are supplied to different embedding models of animation engine 462 based on the component (e.g., character action/intent, prop, visual effect) the label is associated with. The output vector from each embedding model may then be concatenated and supplied to an embedding comparison module of animation engine 462, which may compare the transformed concatenated embedding vector to all other embedding vectors in a database, using a similarity metric such as cosine similarity, for example. The top integer number "N" of similar embedding vectors from the database may then be output and projected into animation streams, and be compared to the previous animation streams corresponding to the present state of the conversation.

The animation stream that corresponds to the predicted next state of the scene within the conversation and also ensures continuity and smoothness from stream-to-stream is selected. The animation stream comparison may be computed based on some aggregation (e.g., maximum or mean) of the last integer number "m" frames in the previous animation stream and the integer number "k" first frames in the candidate animation stream, where k≥1 and m≥1. Depending on the implementation, a video frame interpolation (VFI) model can be added to enforce further smoothness between the previous animation stream and animation stream 114/414 of the predicted next state of the scene.

The scene embedding database can be produced by a feature extraction model such as a convolutional autoencoder, where the bottleneck layer (or some other intermediate layer) is extracted. The component embedding models where each animation stream label 458/558 is supplied can be a dense network with multiple linear layers that was trained on the animation stream embeddings. In this implementation, the projection step would include taking the most similar database encodings to this transformed concatenated label embedding and returning the original corresponding database animation streams. In other implementations, the trained decoder of the autoencoder can be used to project the transformed concatenated label embedding directly to the animation stream domain and similarly finding the most similar streams to return.

Alternatively, if the component embedding models are omitted (the simple case where each model is a single linear layer with the same dimensionality as the input, and all weights set to 1), the Data Exploration and Visualization (DEVise) approach can be applied, where a trained ML model produces a representation for all existing animation streams, and those representations are used to train another ML model to predict the concatenated animation stream label vector. An inversion model (for converting animation stream label vectors to animation streams) would also have to be constructed for the animation streams projection step.

By contrast, where production of animation stream 114/414 in action 684 is performed generatively, action 684 may be performed by a trained generative adversarial network (GAN) or other ML model included in animation engine 462, for example, trained end-to-end for a selection of digital characters, using the outputs of the scene next state metadata prediction stage as input. In this implementation, the model is trained to produce images of a scene including background, props, visual/audio effects, and digital characters 116 performing actions and expressing sentiment. That is to say, when trained end-to-end, the generative GAN or other ML model of animation engine 462 would produce a complete scene including digital character 116 and all animation effects. In other implementations, the skeleton and mesh overlay of digital character 116 could be detached from the process of background generation to help repurpose the same skeleton model for different characters, with props, background, and visual/audio effects generation being trained separately to combine into an animation stream 114/414. In this implementation, the model acts as a transformation between scene metadata output from the previous step and character pose. This can be done through an adjusted standard transformer base architecture, where the head of the model is modified to output keypoint heatmaps for an arbitrary number of keypoints. Facial expression can be predicted as pose points in addition to the 17 common skeletal pose keypoints predicted by standard 2D pose estimation models. The mesh overlay can be calculated through standard techniques such as skeletal subspace deformation.

Thus, in some implementations, producing animation stream 114/414 includes selecting a sequence of video frames from animation resource database 120/320 storing pre-existing animation 122a-122n/322a-322n, while in other implementations action 684 producing animation stream 114/414 includes generating a sequence of video frames.

Whether animation stream 114/414 is produced deterministically or generatively, in addition to the animation generated by animation engine 462, animation stream 114/414 may also include expressive voice effects synthesized by voice synthesizer using speech markup language 466 and haptic effects determined by haptics unit 464.

In some implementations, the method outlined by flowchart 680 may conclude with action 684 described above. However, in other implementations, that method may continue and conclude with rendering animation stream 114/414 on display 108/308 (action 685). It is noted that, in various implementations, animation stream 114/414 may be rendered as a 2D animation, or as a 3D animation. It is further noted that, according to the present novel and inventive concepts, animation stream 114/414 can be rendered in real-time relative to obtaining conversation understanding feature set 454/554 in action 682, or relative to receiving sensor data in action 681. That is to say, animation stream 114/414 can be rendered on display 108/308 by system 100/300 with latency, relative to obtaining conversation understanding feature set 454/554 in action 682 or receiving sensor data in action 681, which is substantially imperceptible to system user 112/312. The rendering of animation stream 114/414 on display 108/308, in action 685, may be performed by software code 110/310, executed by processing hardware 104/304 of system 100/300.

With respect to the method outlined by flowchart 680, it is emphasized that, in some implementations, actions 682, 683, and 684 (hereinafter "actions 682-684"), or action 682-684 and 685, or actions 681 and 682-684, or actions 681, 682-684, and 685, may be performed in an automated process from which human involvement may be omitted.

Thus, the present application discloses systems and methods for producing conversation-driven scene generation that address and overcome the deficiencies in the conventional art. The present application discloses systems and methods that advance the state-of-the-art by enabling production of an animation stream of a digital character participating in an interaction that is dynamically conversation-driven in real-time by the dialogue between the digital character and an interaction partner such as a human user. Moreover, the present animation solution can advantageously be implemented as substantially automated systems and methods.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
   a computing platform having a processing hardware, a plurality of sensors and a system memory storing a software code, the software code including a plurality of trained machine learning (ML) models;
   the processing hardware configured to execute the software code to:
   generate a conversation understanding feature set using at least a first trained ML model of the plurality of trained ML models and sensor data received from the plurality of sensors, the conversation understanding feature set describing a present state of a conversation between a digital character and a system user;
   generate an inference, using at least a second trained ML model of the plurality of trained ML models and the conversation understanding feature set, the inference comprising a plurality of labels describing a predicted next state of a scene within the conversation; and
   produce, using at least a third trained ML model of the plurality of trained ML models and the plurality of labels, an animation stream of the digital character participating in the predicted next state of the scene within the conversation.

2. The system of claim 1, wherein the predicted next state of the scene includes a background, a lighting scheme, and one or more props.

3. The system of claim 1, wherein the predicted next state of the scene includes at least one of a whole body movement, a gesture, or a facial expression of the digital character.

4. The system of claim 1, wherein the system further comprises a display, and wherein the processing hardware is further configured to execute the software code to:
   render the animation stream on the display.

5. The system of claim 4, wherein the animation stream is rendered as a three-dimensional (3D) animation.

6. The system of claim 4, wherein the animation stream is rendered as a two-dimensional (2D) animation.

7. The system of claim 1, wherein the conversation understanding feature set includes voice analysis data and identifies at least one of an intent of the system user, a sentiment of the system user, or a sentiment of the digital character.

8. The system of claim 1, wherein producing the animation stream comprises selecting a sequence of video frames from a database of pre-existing animation.

9. The system of claim 1, wherein producing the animation stream comprises generating a sequence of video frames.

10. The system of claim 1, wherein the animation stream further comprises at least one of synthesized speech by the digital character or one or more haptic effects.

11. A method for use by a system including a computing platform having a processing hardware, a plurality of sensors and a system memory storing a software code, the software code including a plurality of trained machine learning (ML) models:
    generating, by the software code executed by the processing hardware, a conversation understanding feature set using at least a first trained ML model of the plurality of trained ML models and sensor data received from the plurality of sensors, the conversation understanding feature set describing a present state of a conversation between a digital character and a system user;
    generating an inference, by the software code executed by the processing hardware and using at least a second trained ML model of the plurality of trained ML models and the conversation understanding feature set, the inference comprising a plurality of labels describing a predicted next state of a scene within the conversation; and
    producing, by the software code executed by the processing hardware and using at least a third trained ML model of the plurality of trained ML models and the plurality of labels, an animation stream of the digital character participating in the predicted next state of the scene within the conversation.

12. The method of claim 11, wherein the predicted next state of the scene includes a background, a lighting scheme, and one or more props.

13. The method of claim 11, wherein the predicted next state of the scene includes at least one of a whole body movement, a gesture, or a facial expression of the digital character.

14. The method of claim 11, wherein the digital character is depicted in the animation stream using a skeleton model and mesh overlay enabling use of the skeleton model with different mesh overlies corresponding respectively to different digital characters.

15. The method of claim 14, wherein the skeleton model comprises a dense pose model.

16. The method of claim 11, wherein the system further comprises a display, the method further comprising:
    rendering, by the software code executed by the processing hardware, the animation stream on the display.

17. The method of claim 16, wherein the animation stream is rendered as a three-dimensional (3D) animation.

18. The method of claim 11, wherein the conversation understanding feature set includes voice analysis data and identifies at least one of an intent of the system user, a sentiment of the system user, or a sentiment of the digital character.

19. The method of claim 11, wherein producing the animation stream comprises selecting a sequence of video frames from a database of pre-existing animation.

20. The method of claim 11, wherein producing the animation stream comprises generating a sequence of video frames.

21. The method of claim 11, wherein the animation stream further comprises at least one of synthesized speech by the digital character or one or more haptic effects.

22. A method for use by a system including a computing platform having a processing hardware and a system memory storing a software code, the software code including a plurality of trained machine learning (ML) models:
    obtaining, by the software code executed by the processing hardware, a conversation understanding feature set describing a present state of a conversation between a digital character and a system user;
    generating an inference, by the software code executed by the processing hardware and using at least a first trained ML model of the plurality of trained ML models and the conversation understanding feature set, the inference comprising a plurality of labels transformed into two-dimensional (2D) or three-dimensional (3D) skeletal keypoints for a skeleton model of the digital character, the plurality of labels describing a predicted next state of a scene within the conversation; and
    producing, by the software code executed by the processing hardware and using at least a second trained ML model of the plurality of trained ML models and the plurality of labels, an animation stream of the digital character participating in the predicted next state of the scene within the conversation.

23. The method of claim 22, wherein the system further comprises a display, the method further comprising:
   rendering, by the software code executed by the processing hardware, the animation stream on the display.

24. The method of claim 22, wherein the system further comprises a plurality of sensors, the method further comprising:
   generating the conversation understanding feature set, by the software code executed by the processing hardware and using at least a third trained ML model of the plurality of trained ML models and sensor data received from the plurality of sensors.

* * * * *